No. 837,993. PATENTED DEC. 11, 1906.
T. W. WILLIAMS.
SURGICAL INSTRUMENT.
APPLICATION FILED MAR. 14, 1906.

WITNESSES:
INVENTOR
Thaddeus W. Williams
BY
ATTORNEYS.

UNITED STATES PATENT OFFICE.

THADDEUS W. WILLIAMS, OF MILWAUKEE, WISCONSIN.

SURGICAL INSTRUMENT.

No. 837,993.  Specification of Letters Patent.  Patented Dec. 11, 1906.

Application filed March 14, 1906. Serial No. 305,952.

*To all whom it may concern:*

Be it known that I, THADDEUS W. WILLIAMS, a citizen of the United States, residing at Milwaukee, county of Milwaukee, and State of Wisconsin, have invented new and useful Improvements in Surgical Instruments, of which the following is a specification.

My invention relates to improvements in surgical instruments, the same consisting of a combination of splints and other parts adapted to be used for strengthening or supporting deformed limbs or organs of the human body.

The construction of my invention is explained by reference to the accompanying drawings, in which—

Figure 1:
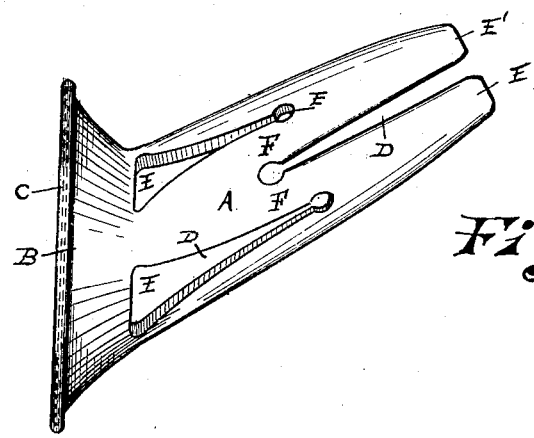
Figure 2:
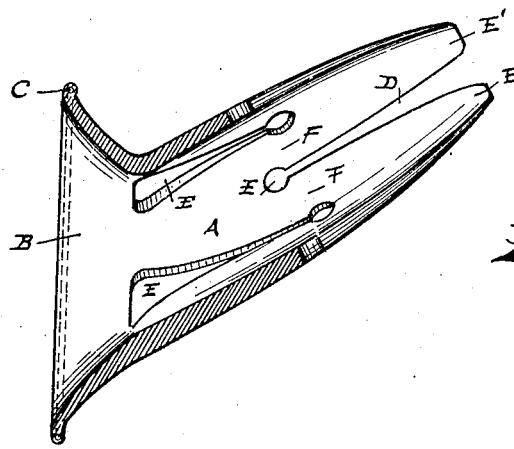

Figure 1 is a side view, and Fig. 2 is a longitudinal section.

Like parts are identified by the same reference-letters in both views.

My device comprises, among other things, the cylindrical portion A, provided at one end with an outwardly-diverging annular flange B, formed at an oblique angle to and integrally with the cylindrical portion, all of which parts are formed of soft rubber or other similar elastic material. The annular flange B is preferably provided with a strengthening-band C, which is formed of metal.

The tubular portion is preferably tapered or converges slightly inwardly from the flange B toward its opposite end and is provided with a plurality of longitudinal V-shaped slits D and apertures E. The approaching ends of the slits and apertures alternate with and extend slightly past each other, whereby a narrower connecting-piece F is left between said slits and apertures, which is adapted to expand, contract, or bend to conform to the limb or organ with or upon which it is used.

It is obvious that the slits D and apertures E subdivide the cylindrical portion A into a plurality of longitudinal supporting-splints E', the ends and marginal edges of which are tapered or rounded, so as to form a smooth contact bearing-surface, whereby the same is prevented from chafing or injuring the parts with which the instrument is used, while they serve to strengthen and support a weak member or retain a crooked or deformed member in its proper and normal position and shape.

Having thus described my invention, what I claim as new, and desire to secure by Letters Patent, is—

1. As a new manufacture, an instrument formed of soft elastic material comprising a longitudinal tubular portion converging toward its longitudinal center and an annular funnel-shaped diverging portion the opened end of which is formed at an oblique angle to the tubular portion.

2. As a new manufacture, an instrument formed of soft elastic material comprising a longitudinal tubular portion subdivided into a plurality of inwardly-converging splints by a plurality of alternating recesses and apertures and provided with an annular diverging portion formed at an oblique angle to the tubular portion.

3. As a new manufacture, an instrument formed of soft elastic material comprising a longitudinal tubular portion subdivided into a plurality of splints by a plurality of recesses and apertures and provided with an annular diverging portion formed integrally at an oblique angle to the tubular portion, all substantially as and for the purpose specified.

In testimony whereof I affix my signature in the presence of two witnesses.

THADDEUS W. WILLIAMS.

Witnesses:
 JAS. B. ERWIN,
 O. R. ERWIN.